United States Patent [19]

Clemmens

[11] Patent Number: 5,050,378
[45] Date of Patent: Sep. 24, 1991

[54] EXHAUST RECHARGING OF A FOUR CYCLE INTERNAL COMBUSTION ENGINE

[76] Inventor: William B. Clemmens, 521 Skydale, Ann Arbor, Mich. 48105

[21] Appl. No.: 337,917

[22] Filed: Apr. 14, 1989

[51] Int. Cl.⁵ .......................................... F02B 27/02
[52] U.S. Cl. ...................................... 60/313; 60/312
[58] Field of Search ........................ 60/313, 312, 314

[56] References Cited

U.S. PATENT DOCUMENTS

| | | | |
|---|---|---|---|
| 1,952,881 | 3/1934 | Minter | 123/75 |
| 2,131,958 | 10/1938 | Kadenacy | 123/65 |
| 2,476,816 | 7/1949 | Carter | 123/65 |
| 2,649,083 | 8/1953 | Vogel | 60/312 |
| 3,298,332 | 1/1967 | Elsbett | 123/52 |
| 3,412,552 | 11/1968 | Elsbett | 60/13 |
| 3,762,381 | 10/1973 | Dave | 123/90.15 |
| 4,075,990 | 2/1978 | Ribeton | 123/119 |
| 4,246,874 | 1/1981 | Nakagawa | 123/308 |
| 4,378,003 | 3/1983 | Imamura | 123/568 |
| 4,424,790 | 1/1984 | Curtil | 123/559 |
| 4,620,510 | 11/1986 | Feuling | 60/312 |
| 4,732,118 | 3/1988 | Tanahashi | 123/65 VD |
| 4,827,880 | 5/1989 | Ban | 60/314 |
| 4,912,930 | 4/1990 | Ueda | 60/313 |

FOREIGN PATENT DOCUMENTS 319426 9/1929 United Kingdom ................. 60/313

OTHER PUBLICATIONS

L. C. Lichty, Combustion Engine Processes, 1967, McGraw-Hill, pp. 2-13, 390-395, 124-136.
Sakai et al., A New Type of Miller Cycle Diesel Engines, JSAE, Apr. 1988, pp. 4-9.
Taylor, The Internal Combustion Engine in Theory and Practice, 2nd Ed. MIT Press 1982, pp. 193, 201, 202, 381, 384, 396-398, 470-475.
Hara et al., Effects of Intake Valve Closing Timing on Spark-Ignition, SAE 850074 (1985).
Sakai et al., A New Type of Miller Super-Charging System-Part I, SAE 851522 (1985).
Ishizuki et al., A New Type of Miller Supercharging System-Part II, SAE 851523 (1985).

Annand et al., Gas Flow in the Internal Combustion Engine, 1974 Foulis & Co. pp. 92-99, 204.
Saueracker, Headers and the Science of Exhaust Tuning, Racer's, Jan. 1989, pp. 68-72.
Fenton, Gasoline Engine Analysis-Mechanical Engineering Publications, 1986, pp. 118-119.
Mafaro's Ride Features All-New Technology, National Dragster, 3-31-89, p. 62.
An Unsteady Flow Analysis of Exhaust Systems for Multicylinder, SAE 690469 (1969).
Effects of Inlet and Exhaust System Design on Engine Performance, SAE 821577 (1982).
Some New Development Aspects of 2-Stroke Cycle Motorcycle, SAE 710084 (1971).
How Near the Optimum in High-Speed Two-Stroke Engines, SAE 710083 (1971).
Simplified Design Criteria for Expansion Chambers for Two Cycle Gasoline Engines SAE 700123 (1970).

Primary Examiner—Douglas Hart
Attorney, Agent, or Firm—James M. Deimen

[57] ABSTRACT

In a spark ignition or compression ignition four cycle internal combustion engine, an exhaust expansion chamber is sized to produce a reflected exhaust pressure wave timed to an auxiliary reopening of the exhaust valve after the intake valve has effectively closed. The reflected exhaust pressure wave causes the re-entry into the cylinder of a quantity of intake charge (which has previously been drawn into the expansion chamber) subsequent to the effective filling of the cylinder through the intake valve, the result being a boost in cylinder charge and pressure on the compression stroke of the piston. At engine design speed, the power output of the engine is substantially improved over the power output without the boost in cylinder charge and in compression stroke pressure. The particular exhaust expansion chambers and valve re-opening timing is adaptable to single and multiple cylinder four cycle engines. With respect to multiple cylinder engines the reflected wave can be timed to feed into another cylinder exhaust valve re-opening.

30 Claims, 5 Drawing Sheets

FIG 11 ized Diesel cycle engine does not utilize throt-
EXHAUST RECHARGING OF A FOUR CYCLE INTERNAL COMBUSTION ENGINE

BACKGROUND OF THE INVENTION

The invention pertains to internal combustion engines, and in particular, to four cycle internal combustion engines operating on the Otto cycle or the Diesel cycle, the former being a constant volume combustion cycle and the latter being a limited pressure combustion cycle.

There are several variations to these basic cycles. Two that are of particular importance are the Atkinson cycle and the Miller cycle. In the basic theory of a naturally aspirated Otto cycle engine, compression occurs from bottom dead center to top dead center with the valves closed. Ignition occurs at top dead center. With ignition the pressure within the cylinder increases and the piston retreats back to bottom dead center. The exhaust valve opens and the exhaust is dumped as the piston again moves to top dead center. The exhaust valve closes and the intake valve opens with the piston now moving back toward bottom dead center to draw in a fresh charge.

In an actual engine, the theoretical valve timing of the Otto cycle is modified substantially to take advantage of inertia effects of the moving intake air and exhaust gases. In an actual engine, the intake valve is closed after bottom dead center and during the initial portion of the compression stroke to take advantage of the inertia effects of the intake air and thereby increase the trapped intake charge resulting in higher engine power. Similarly, the exhaust valve is open before bottom dead center allowing exhaust blow down and thereby returning the cylinder pressure to near atmospheric before the piston moves from bottom dead center to top dead center pushing the exhaust from the cylinder. Slightly before top dead center the intake valve opens to allow the intake charge to begin flowing and slightly after top dead center, the exhaust valve closes. In the naturally aspirated Otto cycle engine, the cylinder pressure within the cylinder during the intake stroke is normally below atmospheric pressure. However, at wide open throttle and high speed, toward the end of the intake stroke, the pressure within the cylinder of a well designed engine may exceed atmospheric pressure due to inertial effects.

Turbo supercharging of the Otto cycle engine assures that the cylinder pressure during the intake stroke from top dead center to bottom dead center is always above atmospheric pressure and the intake manifold pressure is almost always above the cylinder pressure during the exhaust stroke from bottom dead center to top dead center. Only at extremely low speeds is the cylinder pressure of the exhaust cycle likely to equal or exceed the intake manifold pressure. The cylinder pressure during the exhaust stroke from bottom dead center to top dead center is greater than atmospheric pressure.

The naturally aspirated Diesel cycle engine operates substantially similar to the naturally aspirated Otto cycle, however, the constant volume burning at top dead center is followed by constant pressure burning as the piston descends toward bottom dead center on the expansion stroke. During intake from top dead center to bottom dead center, the cylinder pressure during the intake is closer to atmospheric at all loads because the naturally aspirated Diesel engine does not utilize throttling for the intake air. With turbo charging of the Diesel engine, the cylinder pressures during the intake and exhaust strokes of the diesel engine behave in a manner similar to the cylinder pressures of the turbocharged Otto cycle engine.

The Atkinson cycle comprises a modification to either the Otto cycle or Diesel cycle. The Atkinson cycle comprises a cycle in which the expansion stroke is much longer and larger than the compression stroke (Combustion Engine Processes, Lester C. Lichty, 1967, McGraw-Hill p. 10). In the true Atkinson cycle engine, a special crank shaft linkage causes the expansion stroke to be longer than the compression stroke. In the modified Atkinson engine, the intake valve closing is either substantially earlier or substantially later than otherwise, either of which leads to an artificially shortened compression stroke (Effects of Intake-Valve Closing Timing On Spark-Ignition Engine Combustion, SAE 850074).

The Miller cycle can also be applied to the Otto cycle or Diesel cycle engine and borrows the Atkinson cycle principle of a larger expansion stroke than compression stroke (A New Type Of Miller Supercharging System For High Speed Engines Part 2—Realization Of High BMEP Diesel Engines, SAE 851523). In addition, the Miller cycle consists of an increased charging pressure over that feasible without the use of the Atkinson principle and a variation in the intake valve timing while the engine is running.

In essence, the Miller cycle is directed to shifting the intake valve closing to an earlier time before bottom dead center as the load on the engine increases. To compensate for the decreased intake flow because of the early closure of the intake valve, the boost pressure on the turbocharger is increased to provide an intake air charge of essentially the same mass. The pressure volume diagram of the Miller cycle appears like a turbocharged Otto or Diesel cycle engine with the early intake valve closing of the Atkinson cycle. In order to achieve the high levels of turbocharger boost necessary to operate the engine on the Miller cycle, most such engines use a two-stage turbocharger and usually include air coolers for the intake charge. The primary purpose of the Miller cycle is to increase thermal efficiency while maintaining high specific output through high boost pressure.

However, the complex mechanical components necessary to vary the valve timing have lead to the following variants of the Miller cycle. First, is the auxiliary intake control rotary valve (ICRV) (A New Type Of Miller Supercharging System For High Speed Engines Part 1—Fundamental Considerations And Application To Gasoline Engines, SAE 851522, SAE 851523).

In the ICRV concept, an auxiliary rotary control valve is positioned upstream of a normal intake valve. The timing of the intake valve is near bottom dead center. The timing of the rotary valve is adjusted while running to close off the intake channel prior to the closing of the intake valve. The closed timing of the rotary valve is dependent on speed and load (boost pressure) which results in a pressure volume relationship that simulates a normal Miller cycle engine (SAE 851522, p. 3).

The Miller cycle engine suggests that the intake valve can be closed before or near bottom dead center and power can be maintained by utilizing extremely high boost pressures (3.5–5.5 bar) (A New Type Of Miller Cycle Diesel Engines, Sakai et. al. p. 1 & FIG. 6, JSAE Vol. 9, no. 2, Apr. 19, 1988). Thus, the principal of the Miller cycle is to increase the charge density without increasing the maximum pressure in the cylinder. The ratio of the exhaust back pressure to the inlet boost pressure for maximum efficiency should be close to 1; however, in practice, 0.67 is normally used (The Internal Combustion Engine In Theory And Practice, Vol. 1: Thermodynamics, Fluid Flow, Performance, Charles F. Taylor, Fifth Printing Second Edition 1982, MIT Press, p. 384 and example 10–4).

The other variant of the Miller cycle for Diesel engines is provided by the exhaust leak-down method disclosed in U.S. Pat. No. 4,424,790. In the exhaust leak-down method, the intake valve closes near bottom dead center. The exhaust leak-down concept controls the cylinder pressure, and hence the compression stroke by bleeding off cylinder pressure by two alternate and equivalent means. One means is to hold the exhaust valve slightly open throughout the intake stroke. In this way, a portion of the boost pressure is continually blown out the exhaust valve. In the other approach, the exhaust valve is opened immediately after the intake valve has closed allowing the cylinder pressure to escape through the exhaust valve. The amount of pressure bled off the cylinder is automatically controlled by the difference between the boost pressure provided by the turbocharger required in the Miller cycle and the exhaust back pressure created by the turbocharger. As a result, the pressure-volume relationship is modified from the Miller cycle by moving the intake cylinder pressure from the boost pressure towards the average steady flow exhaust pressure (as defined by Taylor, p. 382) during the time the auxiliary exhaust leak is opened.

U.S. Pat. No. 4,424,790 thus discloses an exhaust pressure modulated bleed-off of the boost pressure to achieve a Miller cycle engine. This patent shows that volumetric efficiency and trapping efficiency for the cycle disclosed therein, the Miller cycle, and the Atkinson cycle go down with increasing load. Further, the reference claims that holding the exhaust valve partially open throughout the intake cycle is equivalent to closing the exhaust at the normal time and then reopening the exhaust valve after the intake valve is closed.

To summarize, the momentum effects of a high-speed four cycle Otto or Diesel cycle engine that does not employ the Miller or Atkinson principles, must, in the valve timing, delay the closing of the intake substantially beyond bottom dead center to obtain reasonable power. Generally, the higher the speed or the higher the specific output desired, the later intake valve closing occurs (Taylor, p. 193; Internal Combustion Engines And Air Pollution, Edward F. Oberth, Harper & Row 1973, p. 471–474).

Empirically observed pressure waves or pulses in exhaust pipes are discussed along with computer simulations in a publication entitled "Gas Flow in the Internal Combustion Engine", W. J. D. Annand and G. E. Roe, G. T. Foulis & Co., Ltd., 1974, Sparkford, Yeovil, Somerset, England. Discussed are compression, rarefaction and reflected compression waves. As described, the compression wave is a positive pressure wave occurring when a valve opens and the high upstream cylinder pressure escapes into the exhaust pipe or system. This phenomenon is described by Taylor (p. 382) in terms of the blow-down portion of the exhaust cycle. The rarefaction wave described by Annand and Roe is a "negative pressure" wave transmitted upstream. A reflected compression wave is also described and is a positive pressure wave transmitted upstream which is commonly termed a "plugging pulse". The plugging pulse can prevent the overshoot of intake gases into the exhaust pipe at the end of scavenging during valve overlap (four cycle engine) or the loss of cylinder pressure (two cycle engine).

Annand, et al. describe the effect of the exhaust pipe geometry on the timing and magnitude of compression and rarefaction waves in the exhaust system. The geometry discussed includes constant diameter (straight pipe), divergent, and expansion box pipes. The expansion box disclosed includes a divergent section followed by a convergent section usually with a constant diameter section therebetween. Both the divergent exhaust pipe and the expansion box have a smooth transition between the upstream exhaust pipe (usually constant diameter) and the entrance to the divergent section.

According to Annand, et al. in the straight pipe a rarefaction wave occurs from the sudden expansion of gases at the end of the pipe, the rarefaction wave then traveling upstream in the pipe. Generally an almost imperceptible reflected compression wave ("plugging pulse") also occurs from a straight pipe. In the divergent pipe the rarefaction wave is stronger and more ordered than in the straight pipe. The reflected compression wave also appears as a small but ordered plugging pulse.

The expansion box through the divergent section also produces rarefaction waves moving upstream, however, due to the geometry of the divergent-convergent sections, the strength and general order of the reflected compression wave (plugging pulse) transmitted upstream is much greater than in either the straight pipe or the divergent pipe.

Four cycle engines predominately use an open end constant diameter exhaust pipe or straight pipe. Very rarely is a divergent exhaust pipe used with a four cycle engine, and the expansion box per se is never applied to a four cycle engine. In a four cycle engine with a straight pipe the blow down pulse creates a rarefaction wave that travels upstream and can cause a lower pressure in the cylinder during the exhaust stroke. In a well designed exhaust system, the cylinder pressure during the exhaust stroke can be below atmospheric pressure which increases the scavenging of the exhaust from the cylinder. Subsequently, a pressure wave or plugging pulse is reflected upstream, in particular, when multiple straight pipes are connected to a pulse convertor or collector. In a well designed system, the plugging pulse will arrive at the cylinder in time to prevent the intake charge from exiting through the exhaust valve to the exhaust pipe system. During the early portion of the intake stroke, both the intake and exhaust valve are simultaneously opened (valve overlap) and absent the plugging pulse, the intake charge can exit into the exhaust system.

In contrast, two cycle engines use the plugging pulse or reflected pressure wave in an entirely different manner for a different purpose. The exhaust system of a two cycle engine is typically designed to draw a significant amount of the intake charge into the exhaust system (which includes an expansion box) due to the rarefaction wave following the onset of the blowdown period, since at the time both the exhaust ports and the intake transfer ports are open. Properly designed, the expansion box causes the reflected pressure wave to force the re-entry of some of the intake charge drawn into the expansion box back into the cylinder after the intake transfer ports or passageway leading thereto are closed thereby increasing the trapped charge.

The current approach and design of an expansion box for a two cycle engine is not simply transferable to a four cycle engine, the reason being the reflected pressure wave within the expansion box arrives much too early for the proper effect since the four cycle engine is still on the exhaust stroke. Furthermore, if the reflected pressure wave is delayed to arrive at an equivalent point in the compression stroke of a four cycle engine as compared to a two cycle engine, then the reflected pressure wave arrives to impact the closed exhaust valve. A recent article (Circle Track Magazine, P. Saueracker, January 1989, pp. 68–72) discusses why a reflected compression wave is very undesirable and detrimental to power production in a four cycle engine. Saueracker further describes various techniques that automobile racers are currently using to prevent or attenuate the reflected compression wave as it moves upstream.

Most common are stepped design exhaust headers comprising a series of different diameter straight pipes with sudden transitions between pipes, the pipes decreasing in diameter in the upstream direction. Another approach comprises an anti-reflection chamber ("anti-reversionary chamber") having a diverging section joined to a converging section by an outer constant diameter pipe. But, unlike an expansion box, in the anti-reflection chamber the inlet exhaust pipe extends at constant diameter substantially into the chamber. As taught by Saueracker a zone between the extended internal pipe and the divergent section traps the reflected compression wave before further movement upstream.

U.S. Pat. No. 1,952,881 discloses method and apparatus for reintroducing exhaust gases into the combustion chamber of an engine. The reintroduction of the exhaust gases is accomplished by modifying the cam for the exhaust valve to retain the exhaust valve open during the period of time that the cylinder pressure is less than the pressure in a common log exhaust manifold of a multicylinder engine, thereby allowing the exhaust gases to flow back into the cylinder from the common log manifold. The purpose for the reintroduction of the exhaust gases is to reduce detonation in the cylinder thereby lowering the required octane value of the fuel.

Another relatively early U.S. Pat. No. 2,131,958 discloses a two cycle fuel injected engine cylinder equipped with a crank shaft driven rotary exhaust valve downstream of the exhaust port and a reflection delay device comprising an expansion box with an internal swirl generator. This disclosure is directed to the reintroduction of exhaust gases into the cylinder by the timing of the rotary valve and by additionally delaying the reflected pressure pulse in the exhaust system.

U.S. Pat. No. 2,476,816 discloses two cycle multi-cylinder engines with an exhaust manifold system of constant diameter pipes configured to cause the pressure wave or pressure pulse of blowdown from one cylinder to arrive at another cylinder just prior to the closure of the exhaust at the second cylinder. The result is a sudden charging pressure introduced into the second cylinder just prior to the closure of the exhaust port to the second cylinder. The result is claimed to be more effective in a multi-cylinder two cycle engine than attempting to reintroduce the reflected pressure pulse from a constant diameter pipe into the same cylinder.

More recently, U.S. Pat. No. 3,298,332 disclosed the application of the above blowdown pressure pulse with constant diameter pipes in a multi-cylinder engine to a four cycle engine. The exhaust system disclosed is used in conjunction with a specified intake system consisting of a series of constant diameter pipes. Furthermore, the exhaust system disclosed is limited to connection of cylinders that are 360° apart in the firing order. Thus the blowdown pulse from one cylinder travels through the mutually connected exhaust system so configured that the pulse arrives at the exhaust valve of second cylinder 360° away just prior to the closure of the second cylinder. The disclosure does include the re-entry of any intake air that has escaped into the exhaust manifold thereby improving the volumetric efficiency of the engine.

SUMMARY OF THE INVENTION

The principal object of the new exhaust recharging cycle disclosed below is to increase the power of four cycle internal combustion engines by maximizing the trapping efficiency in the cylinder primarily under full power conditions. The invention is equally applicable to both spark ignition (Otto cycle and its variants) and compression ignition (Diesel cycle and its variants) four cycle engines.

The invention relies upon the use of an expansion chamber or expansion box in the exhaust conduit downstream from the exhaust valve sized to produce a reflected exhaust pressure wave timed to the auxiliary reopening of the exhaust valve after the intake valve has substantially closed. The reflected exhaust pressure wave or pulse causes the re-entry into the cylinder of a quantity of intake charge (which has previously purposely been drawn into the expansion chamber) or intake charge diluted with exhaust gases subsequent to the effective filling of the cylinder with fresh air or fuel-air mix through the intake valve. The result is a boost in cylinder charge and pressure on the compression stroke of the piston. At engine design speed the power output of the engine is substantially improved over the power without the boost in cylinder charge and compression stroke pressure.

Only by combining the intake charge purposefully drawn into the exhaust system with an expansion box and the correctly timed auxiliary opening of the exhaust valve in the four cycle engine can the benefit of increased cylinder charge and trapping efficiency be obtained by using the reflected exhaust pressure wave. The energy contained in this reflected exhaust pressure wave is thus captured rather than lost out the exhaust. Thus, it is the purpose of the expansion box to promote the upstream movement of the reflected compression wave.

At design speed the auxiliary or second opening of the exhaust valve occurs well after bottom dead center (BDC) of the piston stroke and after the intake valve has closed sufficiently to prevent back flow through the intake valve. Thus, the intake valve is effectively closed and cylinder filling through the intake valve not substantially affected. Where an individual cylinder includes two or more exhaust valves, the second opening may optionally be applied to only one valve.

The invention is applicable to both single cylinder and multicylinder four cycle engines. Depending upon the exhaust conduit configuration, the boost can result from a reflected pressure wave from the same cylinder exhaust or from another cylinder exhaust. Thus, expansion chambers can be separately provided for each cylinder or single expansion chambers can be connected to a plurality of cylinders.

The invention is applicable to naturally aspirated engines, supercharged engines and turbo charged engines that are predominantly operated at full power design speed or design speed with maximum power output per unit of fuel. Thus, the invention is most applicable to automotive race cars and dragsters, and to piston engine aircraft. However, the invention is applicable to stationary engines normally continuously operated at design speed under design load or maximum load.

The invention has a particular advantage in piston aircraft engines because the blow down pulse changes little with altitude. Thus, the reflected pressure wave changes little with altitude, however, the intake charge is less dense. Therefore, the reflected pressure wave is able to pack additional charge back into the cylinder. As a result, the reflected pressure wave provides a means of self compensating power regulation with increasing altitude.

As an option to permit the effective length of the expansion box to be adjusted to engine speed over a range of engine speeds, the expansion box may be physically alterable or the thermodynamic properties of the exhaust gases alterable within the expansion box. Means to change the interior length of the expansion box may be employed as further disclosed below, or the gas constant, temperature, density, or ratio of specific heat at constant pressure to specific heat at constant volume of the exhaust gases can be altered as they pass into and through the expansion box. In this manner the effective length of the expansion box may be adjusted over a range of engine speeds.

DESCRIPTION OF THE PREFERRED EMBODIMENTS

Figure 1A:
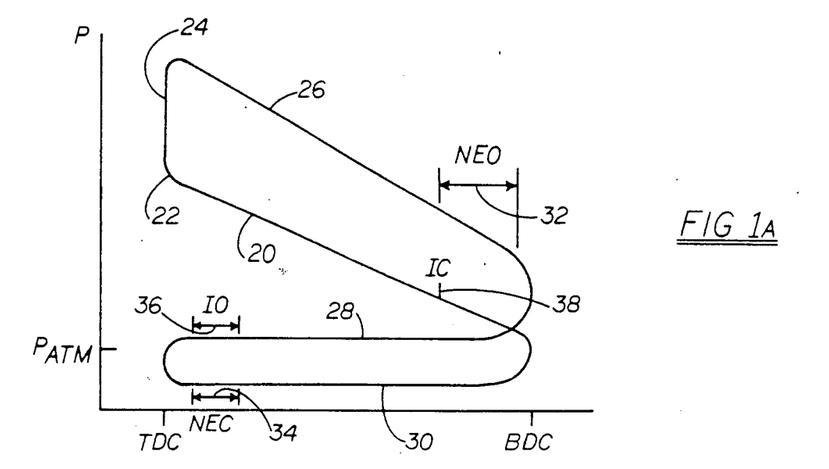
FIGS. 1a, 1b and 1c illustrate by comparison the conventional Otto cycle, the new cycle applied to a conventional Otto cycle and the new cycle applied to a turbo supercharged Otto cycle in terms of engine pressure-volume diagrams.

Illustrated in FIG. 1a is a typical pressure-volume diagram for a naturally aspirated Otto or spark ignition four cycle engine. Beginning with the compression stroke 20, followed by ignition 22 substantially at top dead center (TDC) causing a sudden constant volume pressure increase 24, an expansion stroke 26 completes the first half of the full four cycles. The expansion stroke 26 is followed after bottom dead center (BDC) by an exhaust stroke 28 to TDC and an intake stroke 30 to BDC to complete the full four cycles. As shown cylinder pressure during exhaust 28 is slightly above atmospheric pressure ($P_{atm}$) and during intake 30 is slightly below $P_{atm}$. However, with suitable exhaust devices such as "headers", the cylinder pressure during exhaust 28 may be below the atmospheric pressure.

Also indicated in FIG. 1a is the typical valve timing as a function of cylinder volume. Normal exhaust opening (NEO) is at 32 and normal exhaust closing (NEC) is at 34. Normal intake opening (IO) is at 36 and normal intake closing (IC) is at 38. As indicated in the diagram, the openings and closings may overlap and may begin or end earlier or later over a range as is well known. The intake closing (IC) is shown at a single location in FIGS. 1a, 1b, and 1c for clarity.

Figure 1B:
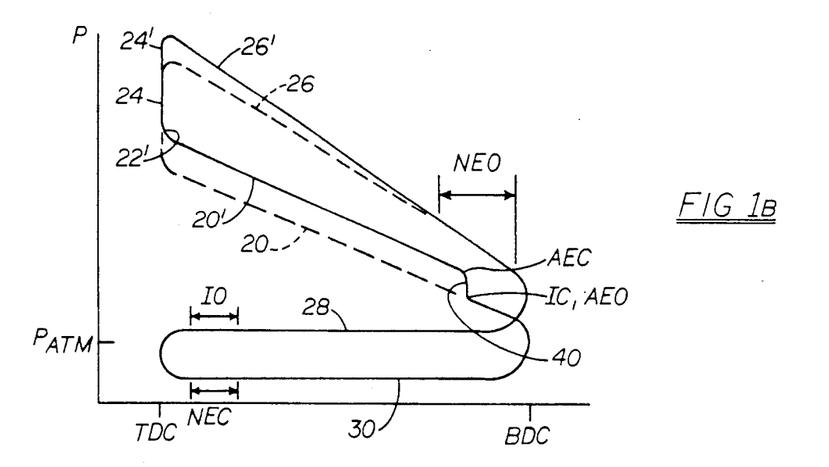

Illustrated in FIG. 1b is a pressure-volume diagram for a naturally aspirated spark ignition engine modified by exhaust recharging of the compression stroke 20. At approximately the intake close (IC) 38 auxiliary exhaust opening (AEO) is effected by means disclosed below causing a sudden increase 40 in compression. This increase in compression results in a higher compression carried through the compression stroke 20', ignition 22', pressure increase 24' and expansion stroke 26'. The power output and thermal efficiency are thereby enhanced without the addition of mechanical boost.

Figure 1C:
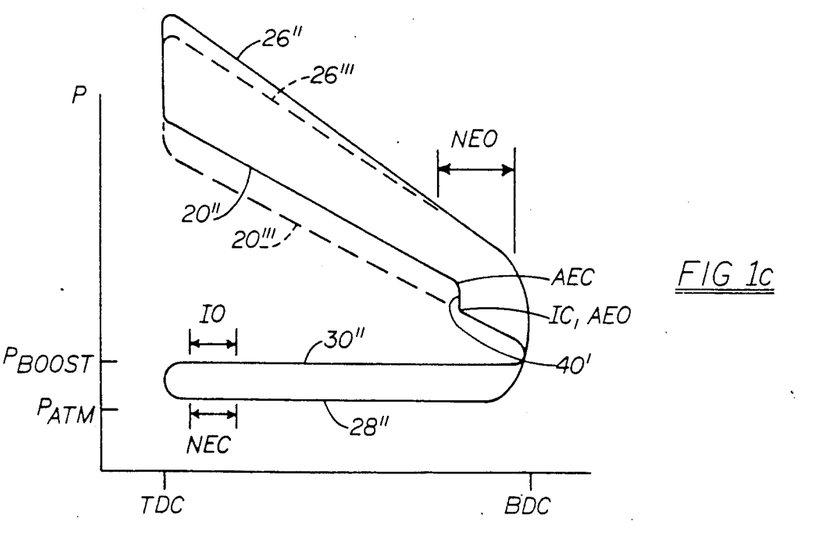

However, the exhaust recharging of the compression stroke can be applied to a spark ignition engine with boost as illustrated in FIG. 1c. Turbocharger boost results in an exhaust stroke 28" above $P_{atm}$ and intake stroke 30" at boost pressure ($P_{boost}$). As is well known the boost pressure raises the pressure in the cylinder through all four cycles. The exhaust recharging modification at approximately IC by an auxiliary exhaust opening AEO causes a sudden increase 40' in compression. This increase in pressure on the compression stroke 20" carries through the expansion stroke 26" as above thus further increasing engine power and thermal efficiency. The dotted lines 20''' and 26''' are to emphasize the instantaneous cylinder pressure in compression and expansion with boost but absent exhaust recharge.

Figure 2:
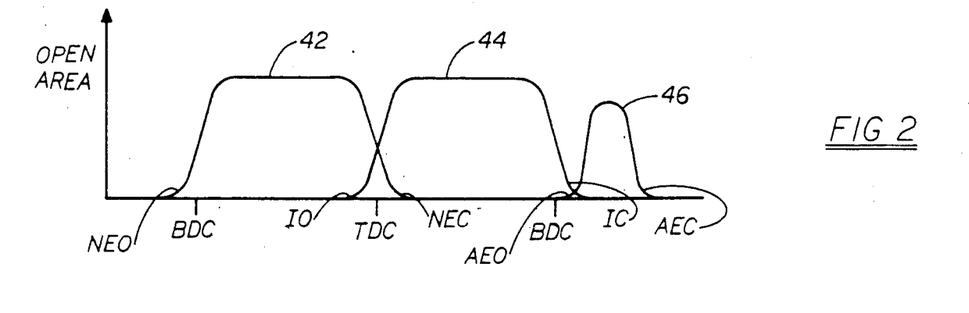
FIG. 2 illustrates valve opening area versus timing for a single cylinder of an engine.

Illustrated in FIG. 2 is a diagram of valve opening area versus valve timing. Line 42 indicates opening and closing of the exhaust valve and line 44 indicates opening and closing of the intake valve. Lines 42 and 44 overlap between the exhaust stroke and intake stroke as indicated at TDC. Line 46 indicates the reopening of the exhaust valve for recharging when the intake valve is effectively closed. As shown the amount of exhaust area open 46 between AEO and AEC is considerably less than the full openings shown by lines 42 and 44. The timing of the AEO is critical and determined by arrival of a reflected compression wave in the exhaust conduit downstream from the exhaust valve.

Figure 3:
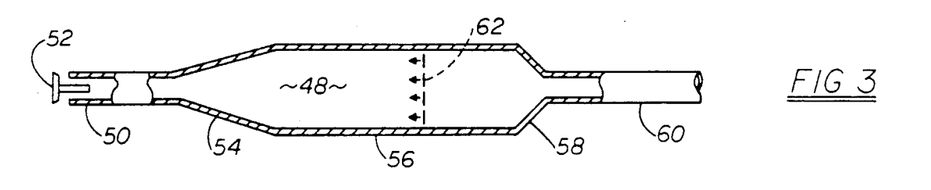
FIG. 3 is a schematic of an exhaust reflection chamber.

FIG. 3 illustrates a single exhaust reflection chamber 48 having a head pipe 50 immediately downstream of the exhaust valve 52, a diverging cone or section 54, a center section 56, a converging reflection cone 58 and an outlet 60 for the exhaust. The size of the reflection chamber 48, in particular, its length is carefully specified to produce a reflected compression wave in the exhaust that arrives back at the exhaust valve 52 as the AEO occurs, thereby causing an amount of intake charge or charge diluted with exhaust gases residing in the chamber 48 to be forced back into the cylinder after the effective closing of the intake valve IC. The mass of intake charge and compression in the cylinder is thereby suddenly increased. Before this extra charge and compression can be dissipated, the exhaust valve recloses (AEC). As an alternative outlet 60 can be attached to the center section 56 with no outlet from the reflection cone 58.

The reflection chamber 48 configuration is a function of exhaust temperature and other gas dynamic properties at design load and the speed of the engine at full power. The reflected wave as indicated schematically by 62 is produced by the reflection off converging cone 58 of the sudden rush of exhaust. The sudden rush of exhaust forward from the exhaust valve 52 through the chamber 48 occurs when the exhaust valve first opens during the exhaust stroke 28 of the engine.

Figure 4A:
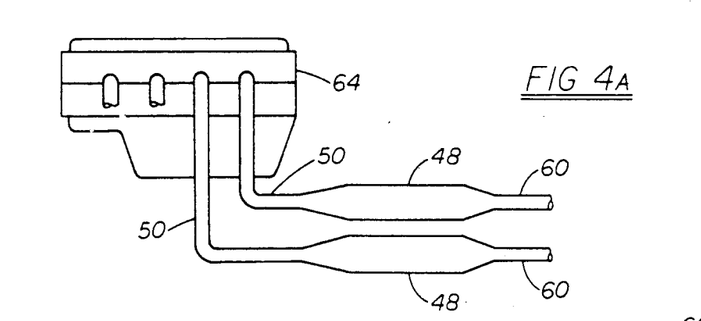
FIGS. 4a, 4b and 4c schematically illustrate the application of expansion chambers to multiple cylinder engines.

The reflection chamber 48 may be applied to a single cylinder engine or separate chambers 48 may be applied to each cylinder in a multicylinder engine 64 as shown schematically in FIG. 4a. As applied to race car engines the reflection length may be about 60 inches depending on engine speed and is therefore applicable but cumbersome. The length is required because of the two revolutions per compression stroke of the engine.

Figure 4B:
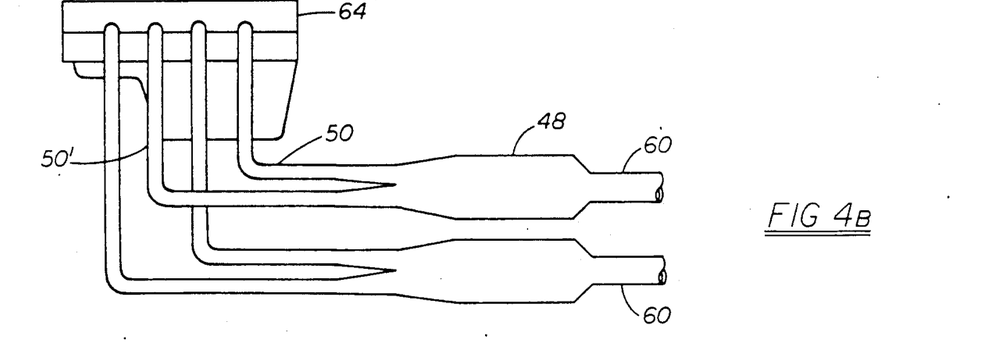

FIG. 4b illustrates a means of shortening the reflection chamber 48 by leading the head pipes 50 and 50' from two separate cylinders into one reflection chamber 48. As a result, the reflected exhaust compression wave from one cylinder arrives back at the other cylinder timed for auxiliary exhaust opening AEO and the reflection distance is substantially halved in length. Thus, by carefully sizing the reflection chamber and head pipes two or more cylinders may be serviced by a single reflection chamber sized as a function of degrees of crankshaft rotation and head pipe length between cylinder AEO's.

Figure 4C:
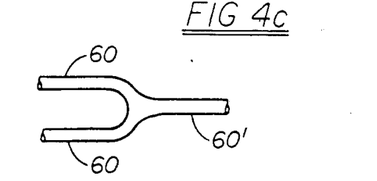

In FIG. 4c the outlets 60 from two or more reflection chambers 48 can be merged downstream into one outlet 60' as shown to meet certain racing rules or to otherwise limit the number of tail pipes extending from the vehicle.

Figure 5A:
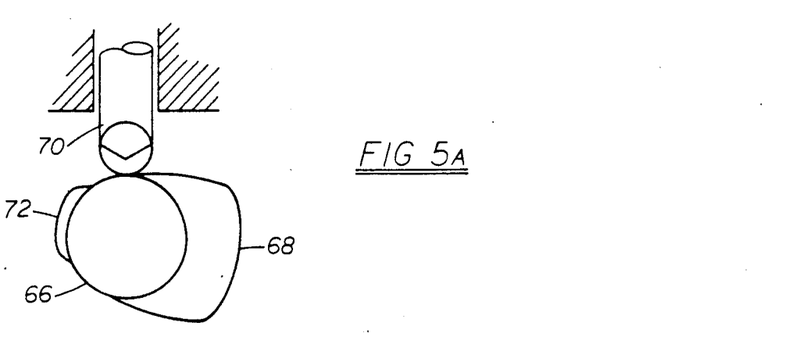
FIGS. 5a, 5b, 5c, 5d, and 5e schematically illustrate cam and follower mechanisms to provide auxiliary opening of a valve.
Figure 5B:
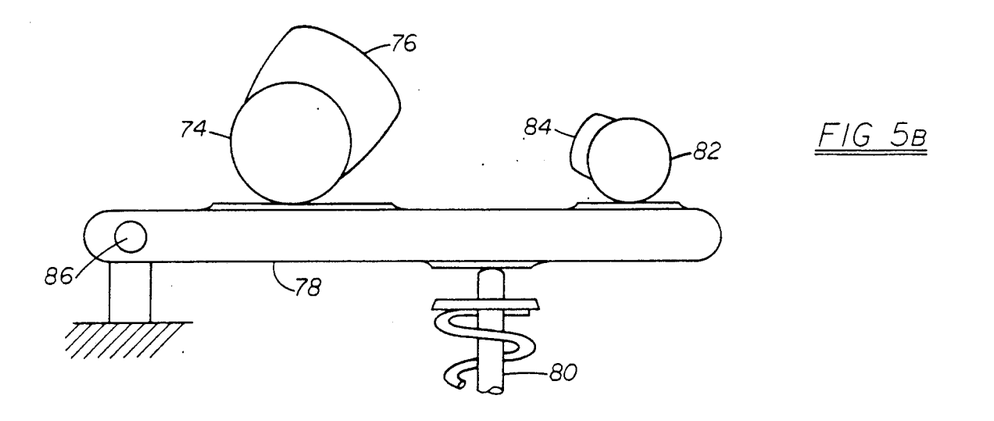

FIGS. 5a through 5e illustrate schematically a number of means to effectuate auxiliary exhaust opening. In FIG. 5a a camshaft 66 includes a large lobe 68 for causing normal valve push rod 70 movement to open the exhaust valve and a second smaller lobe 72 to cause AEO. The configuration of camshaft 66 with a large lobe 68 and a small lobe 72 can also be applied to conventional valve opening mechanisms used in overhead camshaft designs. In FIG. 5b a primary overhead camshaft 74 includes a large lobe 76 that moves a rocker arm 78 in turn opening the valve 80. A second smaller overhead cam 82 with a smaller lobe 84 also engages the rocker arm 78. The camshafts and valve in FIG. 5b are all to one side of the rocker arm fulcrum 86.

Figure 5C:
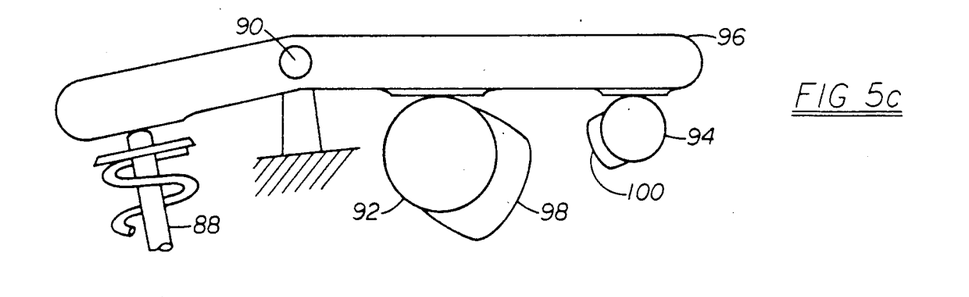
Figure 5D:
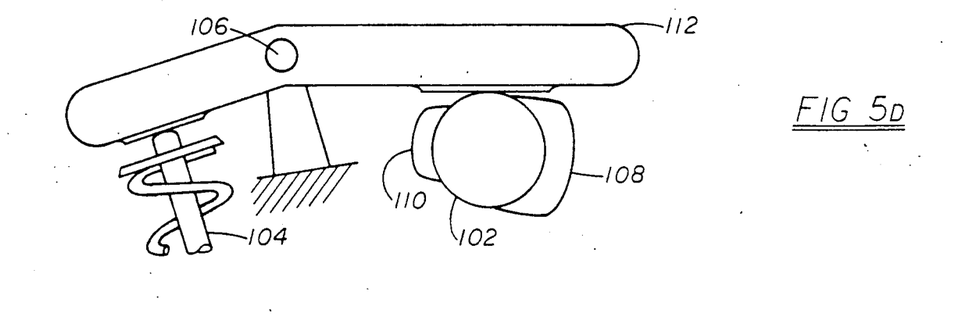
Figure 5E:
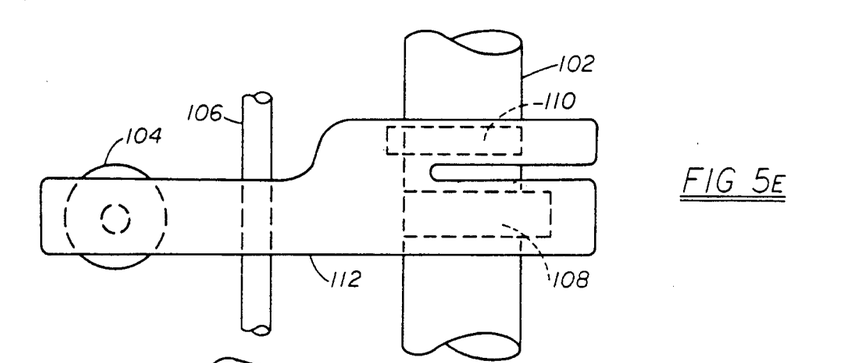

In FIG. 5c the valve 88 is located opposite (about the fulcrum 90) to overhead camshafts 92 and 94 both being located beneath the rocker arm 96. Both the primary camshaft 92 and auxiliary camshaft 94 are equipped with lobes 98 and 100 respectively. In FIGS. 5d and 5e a single overhead camshaft 102 is shown operating a valve 104 about a fulcrum 106. The camshaft 102 includes a primary lobe 108 and auxiliary lobe 110 displaced axially along the camshaft 102. The rocker arm 112 is bifurcated with separate arms engaging the primary lobe 108 and auxiliary lobe 110.

Figure 6:
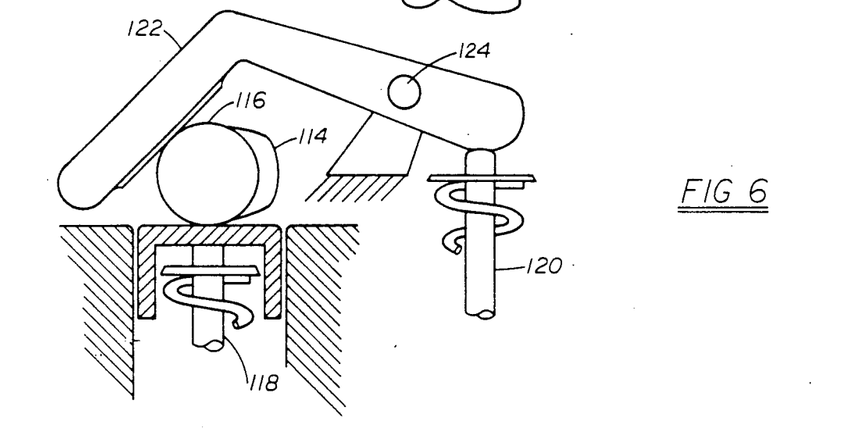
FIG. 6 schematically illustrates a cam and follower mechanism to operate a second valve as an auxiliary valve.

FIG. 6 illustrates the use of a single cam 114 on a single camshaft 116 to operate both the primary exhaust valve 118 and an auxiliary separate exhaust valve 120. The separate valve 120 is actuated by a rocker arm 122 about a fulcrum 124. The separate valve 120 can be much smaller in opening area and differently positioned in the head of the engine cylinder.

The embodiments of FIGS. 5b and 5c offer the possibility of relatively simple timing adjustment relative to the primary cam by adjusting the rotational position relative to the timing belt or chain of the engine. Alternatively, means to deactivate the auxiliary cam can be similar to the means used to deactivate individual cylinders in engines designed to operate on 4, 6 or all 8 cylinders. Thus, the AEO can be selectively used only when the engine is at design speed and load or the timing of the AEO can be adjusted over a range of engine speeds and loads.

Figure 7:
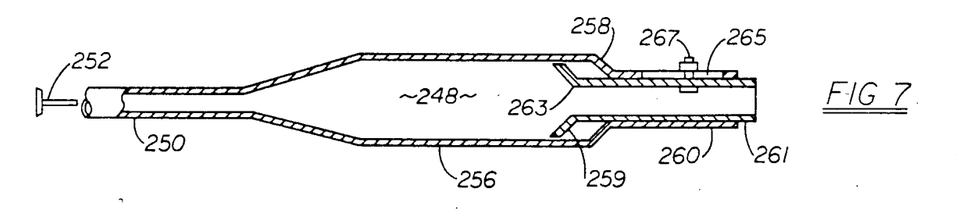
FIG. 7 schematically illustrates a physically adjustable expansion box.

Illustrated in FIG. 7 is an expansion box 248 having a movable reflection cone 259 located toward the downstream end of the box. While a variety of means may be employed to move the reflection cone 259 within the expansion box 248, a tubing sleeve 261 is shown attached to the reflection cone at 263 and extending within the tubular exhaust outlet 260. A slot 265 formed in the tubular exhaust outlet 260 and a bolt 267 engaging the tubular sleeve 261 permit the reflection cone 259 to be moved the length of the slot 265 and set as desired to time to engine speed. In the alternative, the center section 256 may be formed in two telescopically engaged portions to change the length between the exhaust valve 252 and converging cone 258 thereby obviating the need for the internal movable cone 259 and inner sleeve 261. Or, the headpipe 250 can be formed in two telescopically engaged sections to change the length between the exhaust valve 252 and the converging cone 258. A dynamic actuator responsive to changes in speed or load may be used in place of the bolt 267 to adjust the position of the reflection cone 259, or to adjust the telescopically engaged sections.

Figure 8:
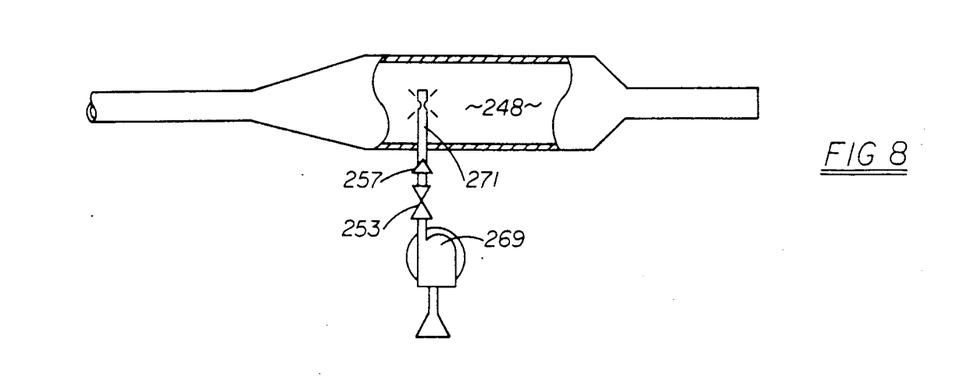
FIG. 8 schematically illustrates means to adjust exhaust gas density and gas constant within the expansion box.

In FIG. 8 an air pump 269 is employed to provide a stream of fresh air through a conduit 271 in communication with the interior of the expansion box 248. The fresh air being substantially more dense and at a temperature considerably below the exhaust temperature mixes with the hot exhaust gases thereby changing the gas dynamic properties of the gaseous mixture in the expansion box 248. The speed of the pulse and, in particular, the reflected pressure wave being a function of specific heat ratio, temperature, and gas constant, thereby may be adjusted downward by increasing the proportion of fresh air to exhaust. The flow of fresh air from the air pump may be a continuous function of engine speed or power output thereby permitting the benefit to apply to a range of engine operating conditions as a vehicle is driven. An orifice or control valve 253 may be used to control the flow rate of air from the air pump 269. The conduit 271 is provided with a check valve 257 to prevent backfire through the conduit 271.

Or, a pressurized source of air or other relatively cool inert gas such as carbon dioxide, argon or Halon may be admitted to the expansion chamber.

Figure 9:
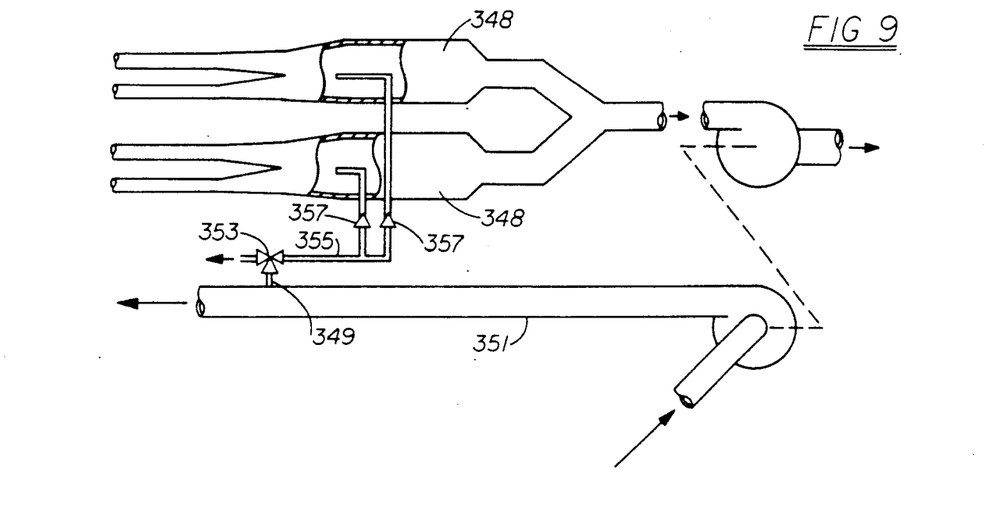
FIG. 9 illustrates supercharging means to add air to the expansion box.

In FIG. 9 the source of the bleed air to the expansion box or chamber 348 comprises a conduit 349 from the turbocharger or supercharger outlet 351 to a proportional control valve 353 or orifice. From the proportional control valve a conduit 355 divides to provide bleed air to each expansion box 348. The divided conduits 355 are provided with check valves 357 to prevent back fire through the conduits 355 and proportional control valve 353. In a manner similar to the air pump above noted, the quantity of bleed air provided through the proportional control valve 353 may be a function of engine speed or engine load.

Figure 10:
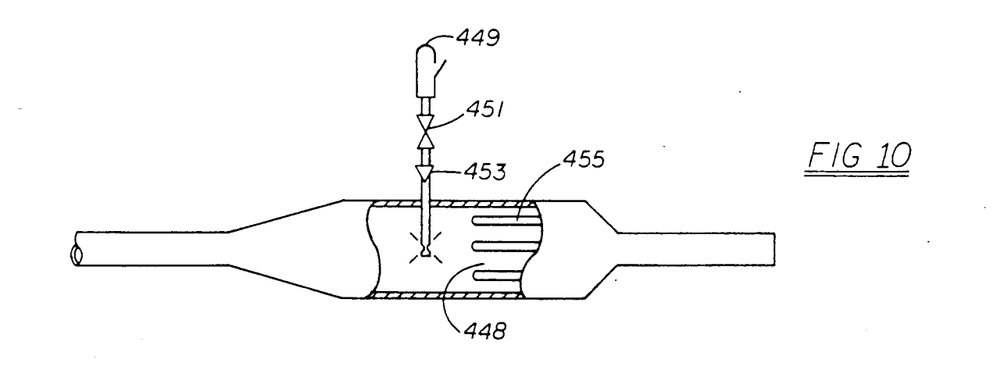
FIG. 10 illustrates non-supercharging means to add air to the expansion box.

In non-turbo or supercharged engines the bleed air may be supplied to each expansion box 448 through a reed valve 449 operated by the vacuum or rarefraction pulses in the exhaust as shown in FIG. 10. A control valve or orifice 451 is incorporated to control the quantity of bleed air admitted and a check valve 453 prevents back fire through the reed valve 449.

The bleed air or other gas admitted to the exhaust can be injected at any location upstream of the convergent reflection cone in FIGS. 8, 9 and 10.

Figure 11:
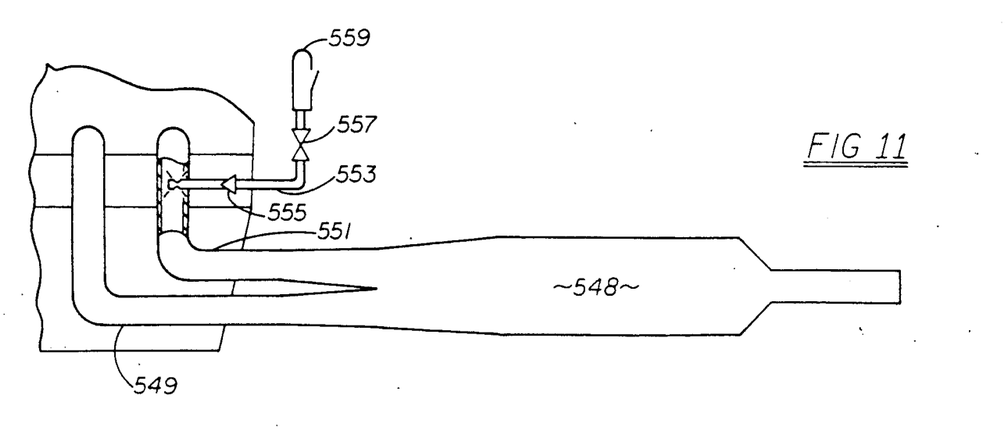
FIG. 11 illustrates means to change the effective length of an exhaust header.

FIG. 11 illustrates the use of bleed air into the exhaust stream to achieve the same "effective" header lengths in an exhaust configuration with differing header lengths leading to an expansion box 548. A physically long header 549 leading from one cylinder parallels a physically short header 551 leading from another cylinder. The short header 551 is equipped with a conduit 553 communicating through a check valve 555, control valve or fixed orifice 557 and reed valve 559 to provide cool bleed air directly into the hot exhaust in the short header. The speed of sound in the short header 551 is effectively slowed thereby slowing the reflected wave in the short header 551 relative to the reflected wave in the long header 549. This change in effective header length can also permit a changed crankshaft angle between the firing-sequence of the cylinders in communication with the same expansion box 548. Clearly, the means to admit air or other gas disclosed in FIGS. 8 or 9 could applied to effectively equalize the header lengths.

In addition to the above means of altering the exhaust gas dynamic properties within the expansion chamber or reflection means to alter the speed of the reflected pressure wave, other means not requiring the addition of a cool gas can be applied to alter the exhaust gas properties. In substitution for the gaseous material, another foreign material such as a liquid in the form of finely divided droplets or a finely comminuted powder may be injected as a spray to absorb sensible heat and otherwise alter the gas properties of the exhaust gases flowing through the exhaust conduits and expansion chamber.

The outlet 60 in FIG. 3 from the expansion chamber 48 can be restricted in flow area, extended in length or other means taken to alter the backpressure on the engine. An increase in backpressure increases the pressure and temperature within the expansion chamber by retaining hot exhaust therein for a longer time period. The result is an increase in reflected pressure wave speed. Thus, a reduction in backpressure tends to lower expansion chamber pressure and reflected wave speed.

The exhaust temperature can also be altered by adding fixed or movable protuberances and internal 455 or external fins to the expansion chamber. Variation of the instant the exhaust valve is opened during the normal exhaust cycle will also affect the exhaust temperature and reflected wave speed. Thus, a multiplicity of means to adjust and tune the arrival of the reflected pressure wave can be applied to a single or multicylinder engine.

What is claimed:

1. In a four cycle internal combustion engine comprising at least one combustion chamber and means to expand and contract the combustion chamber, separate intake and exhaust conduit means in fluid communication with the combustion chamber, at least one intake valve in the intake conduit means and at least one exhaust valve in the exhaust conduit means, and means to open and close said valves in timed sequence with the expansion and contraction of the combustion chamber, the improvement comprising expansion means to draw a portion of an intake charge into the exhaust conduit means, downstream reflective means in the exhaust conduit means to cause a compression wave in the exhaust gases to be reflected back upstream to the exhaust valve and timing means to open the exhaust valve when the intake valve has effectively closed and thereby permit the reflected compression wave to force the re-entry of the intake charge in the exhaust conduit means back into the combustion chamber through the open exhaust valve with the reverse flow re-entry intake charge thereby increasing the charge and pressure in the combustion chamber.

2. The engine of claim 1 wherein the reflection means comprises a converging conduit section spaced downstream from the exhaust valve.

3. The engine of claim 1 wherein the expansion means comprises a diverging conduit section downstream from the exhaust valve and the reflective means comprises a converging conduit section further spaced from the exhaust valve to together form a reflection chamber.

4. The engine of claim 1 wherein the combination of flow area and open time of the open exhaust valve during reverse flow re-entry intake charge is substantially less than the combination of flow area and open time of the open exhaust valve during the exhaust stroke contraction of the combustion chamber.

5. The engine of claim 1 wherein the combustion chamber comprises a cylinder and reciprocating piston therein, and wherein the opening of the exhaust valve to admit the reverse flow re-entry intake charge occurs after the reciprocating piston reciprocating piston has passed bottom dead center and begun the compression stroke.

6. The engine of claim 1 wherein the means timed to open the exhaust valve for reverse flow re-entry of the intake charge includes means to disable the timing means and thereby prevent opening of the exhaust valve for re-entry of the intake charge.

7. In a four cycle internal combustion engine comprising at least one cylinder and a piston reciprocable therein, intake and exhaust conduit means in fluid communication with the cylinder, at least one intake valve in the intake conduit means and at least one exhaust valve in the exhaust conduit means, and means to open and close said valves in timed sequence with the movement of the reciprocable piston, the improvement comprising a reflection chamber in the exhaust conduit means, said chamber configured to cause rarefaction waves in the chamber gases and said chamber configured to cause compression waves in the chamber gases to be reflected back upstream to the exhaust valve, timing means to open the exhaust valve as a reflected compression wave arrives at the exhaust valve to permit the compression wave to re-enter the cylinder and thereby cause reverse flow of any intake gases previously drawn into the chamber back through the exhaust valve and into the cylinder.

8. The engine of claim 7 including means to adjust the valve timing means as a function of degrees of rotation during the intake cycle to thereby retain opening of the exhaust valve at the arrival of the reflected compression wave.

9. The engine of claim 7 wherein each cylinder includes at least two exhaust valves, at least one of said two exhaust valves being opened during the intake cycle at the arrival of the reflected compression wave.

10. The engine of claim 9 wherein the timing means includes a cam shaft having a single lobe for actuation of both valves and a rocker arm adapted to engage the lobe and one valve.

11. The engine of claim 7 including means to vary the effective length of the reflection chamber with engine speed to thereby retain co-incident arrival of the reflected compression wave with opening of the exhaust valve during intake cycle.

12. The engine of claim 7 including means to vary the effective length of the reflection chamber with engine load.

13. The engine of claim 7 wherein the valve timing means includes a cam shaft and a pair of lobes on said cam shaft aligned for sequential engagement with the exhaust valve as the shaft rotates.

14. The engine of claim 13 wherein the engagement with the exhaust valve includes a rocker arm.

15. The engine of claim 7 wherein the timing means includes a pair of cam shafts, an arm adapted to engage the exhaust valve and the pair of cam shafts, and a lobe on each cam shaft aligned for sequential engagement with said arm for sequential opening of the exhaust valve as the cam shafts rotate.

16. In a four cycle internal combustion engine comprising a plurality of cylinders, at least one reciprocable piston in each cylinder, intake and exhaust conduit means in fluid communication with each cylinder, at least one intake valve controlling the fluid entering each cylinder through the intake conduit means and at least one exhaust valve controlling the exhaust gases exiting each cylinder through the exhaust conduit means, and means to open and close said valves in timed sequence with the movement of the reciprocable pistons, the improvement comprising at least one reflection chamber in said exhaust conduit means, said reflection chamber in communication with at least two cylinders, said chamber configured to cause rarefaction waves in said reflection chamber and to cause compression waves in said reflection chamber to be reflected back upstream to the exhaust valves of the two cylinders, timing means to open the exhaust valves upon the arrival of selected reflected compression waves whereby any intake gases previously drawn into the exhaust conduit means through one exhaust valve are caused by a reflected compression wave to be forced back through the one exhaust valve into the cylinder, said reflected compression wave resulting from the exhaust blow down exiting through another exhaust valve into the reflection chamber.

17. The engine of claim 16 including means to adjust the timing means as a function of degrees of rotation during the intake cycle to thereby retain opening of the exhaust valve at the arrival of the reflected compression wave.

18. The engine of claim 16 wherein each cylinder includes at least two exhaust valves, at least one of said two exhaust valves being opened during the intake cycle at the arrival of the reflected compression wave from another cylinder.

19. The engine of claim 16 including means to vary the effective length of the reflection chamber with engine speed to thereby retain arrival of the reflected compression wave with opening of the exhaust valve during the intake cycle.

20. The engine of claim 16 including means to vary the effective length of the reflection chamber with engine load.

21. The engine of claims 1, 7 or 16 including means to change the physical length of the reflection means, said reflection means comprising a convergent section in the exhaust conduit means and said length being the length from the exhaust valve to the convergent section.

22. The engine of claims 1, 7 or 16 including means to alter the speed of reflected compression waves in the reflection means comprising means to introduce a foreign material into the reflection means during operation of the engine.

23. The engine of claim 22 wherein the foreign material comprises air.

24. The engine of claim 22 wherein the means to introduce a foreign material comprise a pressurized source of gaseous material in fluid communication with the reflection means, and means to control the flow of gaseous material through the fluid communication.

25. The engine of claim 22 wherein the means to introduce a foreign material comprise supercharge means adapted to supply pressurized air and in fluid communication with the reflection means, and means to control the flow of the air through the fluid communication.

26. The engine of claim 22 wherein the means to introduce a foreign material comprise a reed valve in fluid communication with the reflection means, and means to control the flow of the foreign material through the fluid communication.

27. The engine of claim 22 wherein the means to introduce a foreign material comprise at least one header pipe leading from the exhaust valve and a source of the foreign material in fluid communication with the header pipe.

28. The engine of claims 1, 7 or 16 including means attached to the exhaust conduit means to extract heat from the exhaust gases, said means to extract heat being located upstream of the means to cause a compression wave to be reflected.

29. The engine of claims 1, 7 or 16 including means to alter the backpressure in the exhaust conduit means and thereby alter the temperature of the exhaust gases through which the reflected compression wave passes.

30. The engine of claim 16 wherein the exhaust conduit means include header pipes of unequal length leading to said reflection chamber and a source of foreign material in fluid communication with at least one of the header pipes adapted to admit the foreign material to the header pipe.

* * * * *